United States Patent Office 2,858,264
Patented Oct. 28, 1958

2,858,264

SELECTIVE CATION-PERMEABLE BARRIERS

Geert J. de Jong, Amsterdam, Netherlands, assignor to Stamicarbon N. V., Heerlen, Netherlands No Drawing. Application August 27, 1954
Serial No. 452,728

Claims priority, application Netherlands August 29, 1953

2 Claims. (Cl. 204—296)

The present invention relates to selective cation-permeable barriers and to the preparation and uses of these products.

It is well known that in the electrodialytical treatment of liquids, e. g., the desalting of brackish or saline water, use may advantageously be made of barriers which are selectively permeable, whether to anions or to cations.

Said barriers may have different shapes, e. g., they may be in the form of membranes, plates, sheets, pipes, tubes or the like. The only essential feature is that one of the dimensions, say the wall thickness, of the barrier be comparatively small as compared with the other dimensions, so as to ensure an adequate passage of the ions for which the barrier is selectively permeable through the thinner part thereof.

The selective permeability aforesaid is obtained by preparing the barriers from macromolecular substances possessing ion exchange properties or by so treating suitable products of the desired shape that they obtain ion exchange properties. Thus, for example, if the barrier consists of a cation exchange material having sulfonic acid groups for its active groups, the negative charge of the ionized sulfonic acid groups will prevent anions from permeating through the barriers, whereas cations can pass freely.

Selective barriers have been described hitherto which consist of polymeric compounds having aromatic groups to which ionogenic groups are bound. According to this disclosure the barriers must be formed in the presence of a given minimum amount of water, in order to ensure their permeability to water.

Furthermore, various other types of barriers have been proposed, of which none, however, satisfied the demands which have to be made on a good barrier, viz., great mechanical strength, low elongation at break, high chemical stability, low electrical resistance and the greatest possible selectivity (also at higher ion concentrations and over a wide pH-range). A further requirement is that the preparation process be simple and easily reproducible.

It is the main object of the present invention to provide selective cation-permeable barriers which have great mechanical strength, low elongation at break, high chemical stability and low electrical resistance.

A further object of the invention is to provide selective cation-permeable barriers which are practically totally impervious to anions, both at lower and higher ion concentrations and over a wide pH-range.

A still further object of the invention is to provide a process for the preparation of the said selective cation-permeable barriers which is simple and easily reproducible.

Still further objects and the entire scope of applicability of the invention will become apparent from the detailed description given hereinafter, and in the appertaining claims; it should be understood, however, that the detailed description and specific examples are given by way of illustration and not of limitation.

According to the invention, selective cation-permeable barriers may be obtained in a simple manner as hereinafter specified by treating products of suitable shape consisting of polyethylene in the dry state with chlorosulfonic acid or other sulfonating agent. Chlorosulfonic acid is the preferred sulfonating agent because with it the reaction may be carried out at a relatively low temperature and is complete in a relatively short time. Other sulfonating agents may be used, however, but sulphuric acid is so slow as to be of little use for a practical point of view.

Instead of polyethylene a copolymer largely consisting of ethylene may be used. By way of example mention may be made of copolymers of ethylene and other unsaturated hydrocarbons, such as propylene or butylene, or of ethylene and vinyl chloride. The treament of such like products with chlorosulfonic acid has already been described previously. However, in this treatment use is made of an inert liquid solvent or dispersion medium for the polymer and rubber-like products are obtained which contain chlorine to the extent of 30% or more but only little sulfur, e. g., 0.38%.

In contradistinction to these products the selective barriers according to the invention contain only little chlorine or none at all—usually less than 1.5%—while the sulfur content is usually 4–5%.

These barriers do not possess the properties of rubber-like products. They have little elasticity, the elongation at break amounting to only 10–20%. In contrast herewith, e. g., polyethylene foils which were used as the starting products showed an elongation at break of 500–600%.

In an investigation it appeared probable that part of the sulfur is found in the form of $SO_2$ bridges between the polyethylene chains. The greater part of the sulfur appeared to be bound in the form of sulfonic acid groups, however.

The mechanical strength of the barriers according to the invention amply suffices, while barriers with a wall thickness smaller than about 1 mm. also appear to be sufficiently flexible. It is also possible without difficulty to prepare thicker or thinner barriers.

In the preparation of selective barriers according to the invention a polyethylene product of the desired shape may be treated in the dry state with an excess of chlorosulfonic acid at a temperature between 0 and 50° C., preferably between 20 and 40° C. At temperatures over 50° C. the reaction appeared too vigorous to permit of adequate control. At temperatures below 0° the action of the chlorosulfonic acid on the polyethylene was so slight that the reaction was too protracted. The period necessary for treating a product with a wall thickness of 0.1 mm. even at 20° C. is as long as 8–12 hours; at 35° C. it is 2–3 hours. The chlorosulfonic acid treatment must be continued until the innermost part of the polyethylene has been sulfonated otherwise the electrical resistance of the barrier would be higher than can be permitted. This may be established by measuring the electrical resistance of the barriers in a dilute NaCl solution, e. g. with the help of calomel electrodes. The barriers are suitable for use if the resistance has fallen to below 1Ω per dm.² of permeable wall area.

Instead of pure chlorosulfonic acid mixtures of chlorosulfonic acid and concentrated sulfuric acid or oleum may be used. It was found that 96% $H_2SO_4$ without admixtures is not sufficiently active as a sulfonating agent.

Preferably, the resulting sulfonation product is washed successively with sulfuric acid solutions of decreasing concentration and finally with water. Direct washing with water has a very deleterious effect on the mechanical strength of the barriers.

One convenient way of carrying out the preparation of the barriers according to the invention consists in passing polyethylene in the form of a continuous strip through chlorosulfonic acid and subsequently rinsing it continuously in counter-current, thereby obtaining the barrier in the form of a membrane.

As is described in co-pending patent application Ser. No. 453,729, filed August 27, 1954, the strip may be treated only in part and not over its entire width, should this be desired. Thus membranes provided with a margin are obtained.

Instead of starting from a foil, other shaped products such as sheets, pipes or products differently set up in profile may be used for starting the manufacture. The only requirement is that one of the dimensions, say the wall thickness, of the product be comparatively small as compared with its other dimensions.

In order to explain the invention—without intending to restrict it in any way—some of the methods which may be applied for preparing the barriers according to the invention are given in the following examples.

*Example 1*

A polyethylene foil of 0.10 mm. thick was treated with an excess of chlorosulfonic acid at a temperature of 20° C. The resulting membrane was washed after a certain time whereupon the cation exchange capacity, the electrical resistance and the elongation at break were determined.

It was found that after a four hour treatment the capacity amounted to 0.79 m. eq. per gram, the resistance to 160$\Omega$/dm.$^2$ and the elongation at break to 25%. After 8 hours the capacity was 1.18 m. eq. per gram, the resistance 0.26$\Omega$/dm.$^2$; after 12 hours the corresponding figures were 1.05 m. eq. per gram and 0.22$\Omega$/dm.$^2$. The elongation at break had then fallen to 10%.

The resulting membrane had a dark brown colour and was very swollen but the swelling decreased considerably during the washing process, which consisted in washing the membrane with 100% $H_2SO_4$, 50% $H_2SO_4$ and water successively. It is important that the membrane be kept stretched during this treatment, as otherwise folds are easily formed which are difficult to remove afterwards.

The electrical resistance of the membrane was determined in a cell filled with a 0.05 molar solution of NaCl and provided with calomel electrodes, at a current density of some milliamperes per cm.$^2$.

In an electrodialytic test it was found that the resulting membrane was practically totally impervious to anions, so that it is excellently suited to be used for the complete desalting of, e. g., sea water.

*Example 2*

A polyethylene foil of 0.1 mm. thick was treated with chlorosulfonic acid at 35° C.

After 1 hour the capacity amounted already to 0.71 m. eq. per gram and after 2 hours it was 1.3 m. eq. per gram, as appeared from measurements. After 1 hour the resistance proved to be as high as 700$\Omega$/dm.$^2$. After 2 hours the resistance had decreased to 0.24$\Omega$/dm.$^2$. Continuance of the treatment for 1 hour resulted in a slight improvement in capacity and resistance. When the foil was analysed the following results were obtained:

| Treatment period | Percent Cl | Percent S |
|---|---|---|
| 1 hour | 0.4 | 3.2 |
| 2 hours | 1.4 | 4.8 |
| 3 hours | 2.3 | 5.3 |

After a washing treatment as described in Example 1, the membrane appeared to have a water content of about 20%. In an electrodialytic test it was found that also in this case the resulting membrane was totally impervious to anions.

I claim:

1. A process for the preparation of a selective cation-permeable barrier which comprises sulphonating a film of a polymer selected from the group consisting of normally solid ethylene homopolymers and copolymers containing ethylene as a major ingredient with chlorosulfonic acid in the dry state at a temperature of between 0° and 50° C. and in the absence of a catalyst, until the electrical resistance per square decimeter of permeable wall area of said article is below 1$\Omega$.

2. A selective cation-permeable barrier of sulphonated, substantially chlorine-free polymer selected from the group consisting of normally solid ethylene homopolymers and copolymers containing ethylene as a major ingredient, said barrier having an electrical resistance of below 1$\Omega$ per square decimeter of permeable wall area and low elasticity with an elongation at break not exceeding 20%.

References Cited in the file of this patent

UNITED STATES PATENTS

| | | |
|---|---|---|
| 2,212,786 | McQueen | Aug. 27, 1940 |
| 2,586,363 | McAlevy | Feb. 19, 1952 |
| 2,636,852 | Juda et al. | Apr. 28, 1953 |
| 2,681,320 | Brodamer | June 15, 1954 |
| 2,717,888 | Feller et al. | Sept. 13, 1955 |
| 2,731,411 | Clarke | Jan. 17, 1956 |
| 2,733,231 | Bauman et al. | Jan. 31, 1956 |

OTHER REFERENCES

Brooks et al.: "India Rubber World," March 1953, pp. 791 to 793, article entitled "Chlorinated Polyethylene—I."